C. A. JOHNSON.
SKIM MILK AND WHEY MEASURING AND DELIVERING DEVICE.
APPLICATION FILED DEC. 28, 1908.
923,183. Patented June 1, 1909.
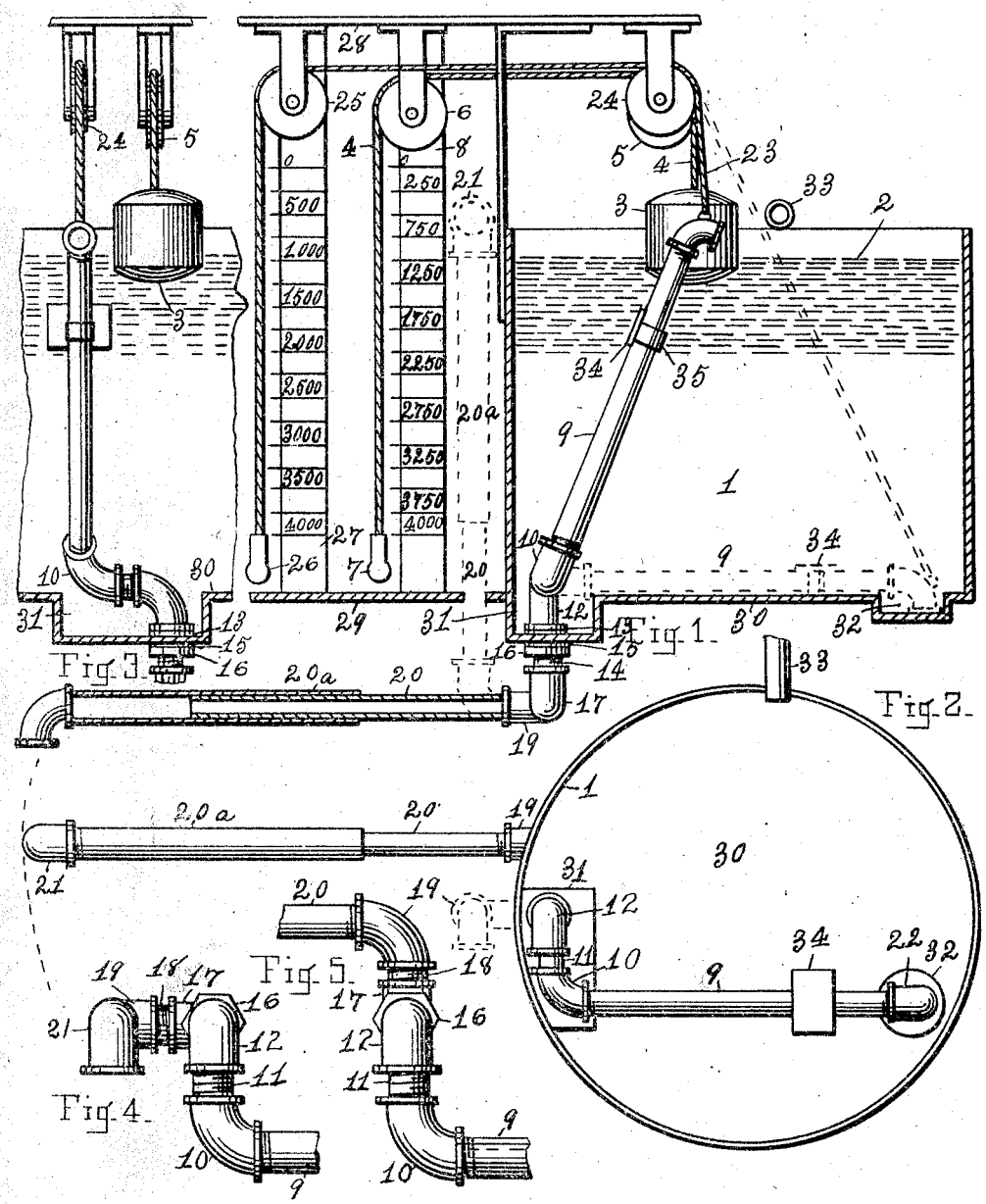

UNITED STATES PATENT OFFICE.

CARL A. JOHNSON, OF NORTHPORT, WISCONSIN.

SKIM-MILK AND WHEY MEASURING AND DELIVERING DEVICE.

No. 923,183.   Specification of Letters Patent.   Patented June 1, 1909.

Application filed December 28, 1908. Serial No. 469,692.

*To all whom it may concern:*

Be it known that I, CARL A. JOHNSON, a citizen of the United States, residing at Northport, in the county of Waupacca and State of Wisconsin, have invented a new and useful Skim-Milk and Whey Measuring and Delivering Device, of which the following is a specification.

My invention relates to a measuring device for measuring and delivering the amount of skim milk or whey, as the case may be, to which the patrons of creameries and cheese factories are entitled to have returned to them, and it consists of a tank for holding the liquid to be delivered, indicating means for showing the amount of liquid in the tank at any one time, a pipe for delivering liquid to said tank from a source of supply, and pipes for delivering to the patrons the number of gallons to which each one is entitled, in accordance with a scale of measurements which is arranged near said tank, and the object of my improvement is, to deliver the approximate amount of liquid to each patron to which he is entitled, and thereby prevent dissatisfaction among the patrons in the distribution of said skim milk or whey. I attain this object by the mechanism illustrated in the accompanying drawing, in which,—

Figure 1 is a vertical section of a tank showing in elevation the means for indicating the amount of liquid therein, the pipe through which the liquid may be delivered to the tank, and pipes for its delivery to the milk cans of the patrons of the establishment, and an indicating scale for showing the amount which each one receives. Fig. 2 is a plan showing a tank and delivery and discharge pipes, but omitting the discharge pipe operating device, the scale of measurements and indicating float, shown in Figs. 1 and 3. Fig. 3 is an elevation showing a portion of the inside of the tank with the discharge pipe therein, and a float arranged upon the surface of the liquid therein. Fig. 4 is a plan of the pipe both above and below the tank bottom, with the delivery end raised, as shown in dotted lines in Fig. 1, its receiving end being broken. Fig. 5 is a plan of the pipe both above and below the tank bottom, with the delivery end horizontal, for delivering liquid, both free ends being broken. Figs. 4 and 5 are upon a larger scale than the others.

Similar numerals and letters indicate like parts in the several views.

1, indicates a tank; 2, a liquid surface, the liquid of course filling the tank to the upper dotted line, but is not indicated in the lower part of the tank so as not to obscure the pipes and their connections, therein.

3, indicates a float which is supported by the liquid, it being connected by a flexible connection 4, which runs over pulleys 5 and 6 and is provided with an indicator weight 7, which indicates by its position relative to the scale board 8, the position of the float, vertically, within the tank.

9, is a pipe section, hinged by means of the elbow 10, and thimble 11, to the elbow 12, the latter elbow resting upon a packing piece 13, and a thimble 14 being screwed into the elbow 12 and extending downward through the tank bottom and is provided with a packing piece 15 and nut 16, the nut being screwed upon the thimble and clamping the bottom of the tank between the two packing pieces. Upon the lower end of the thimble 14, an elbow 17, is mounted, then another thimble 18 and elbow 19, are attached, and finally a pipe section 20, is inserted in the latter elbow, and through which the liquid in the tank is delivered. This pipe being connected with the thimble 14, which extends downward through the tank bottom and being provided with two elbows and two thimbles, the pipe 20 is adapted to be swung around as shown in Fig. 4, and in dotted lines in Fig. 2, and also, to be swung into a vertical position, as shown in dotted lines in Fig. 1, for preventing the escape of liquid, and also, is adapted to swing laterally, as indicated by the dotted curved line in Fig. 2, for reaching milk cans which may be in various positions relative to the tank.

The tank should be located for convenience at such a height above the ground that a wagon with milk cans thereon can be driven under the outer end of the delivery pipe and receive its supply. For greater convenience in reaching cans, nearer to or farther from the tank, the delivery pipe is formed of two sections, 20 and 20ª, the latter inclosing the former for part of its length, and being fitted to slide with a liquid tight fit along the former, as is shown in a sectional view of the two sections in Fig. 1. The end of the section 20ª, is provided with an elbow 21 for directing the liquid downward. The tank having been emptied, or partly so, upon raising the outer end of the pipe above the surface of the liquid in the tank, no liquid can enter it, and after the pipes 20 and 20ª, have been drained of all within them, by swinging them around into the position they are represented to be, in dotted lines in Figs. 1 and 2, no liquid can escape from the tank, unless perchance the tank is filled above the line 2.

As shown, the several elbows are arranged to turn around upon the threads of the thimbles, they serving as unions, but the substitution of the common gas pipe unions of commerce for the thimbles, I consider its equivalent, and may sometimes be used.

The free end of the pipe section 9, is provided with an elbow 22, to which a flexible connection 23, is attached, it running over pulleys 24 and 25, and ending in a scale indicating weight 26, which is arranged to be raised and lowered along side of the scale indicating board 27, said scale board and the scale board 8, in the present case extending from the pulley hanger piece 28 to the platform 29, but may be located near the milk receiving attendant at some distance from the tank when desirable. The indicating boards 8 and 27 are divided by horizontal lines into sections which are numbered, and indicate that when the float and opening into the pipe section 9 are as shown, the float floating upon the liquid and the pipe opening being just above its surface, there are 4,000 gallons of liquid in the tank. The pipes 20 and 20ª, being in a vertical position, are to be lowered and the elbow 21, swung around over the patron's milk can. If the first patron is entitled to 250 gallons, the weight 26 will be raised to the 3,750 gallon mark and the end of the pipe section 9, allowed to fall until the amount has run out, the weight on the float connecting line rising meanwhile, until it reaches the 3,750 figures, when his 250 gallons will have been delivered. The end of the pipe section 9, can then be raised by a pull on the line 23, so as to stop the dripping from said pipe, and the pipe section 20, can be raised to a vertical position, if desired. Then by raising the weight 26 to the 3,500 mark, another 250 gallons can be run out to the second patron, as before. It will be evident that these figures on the scale board will be governed by the amount in gallons that the tank holds, and the scale marks and figures can be made for indicating down to a single gallon, that being with skim milk and whey, as small a measure as will be essential.

The bottom 30, of the tank is provided with sunken places, 31 and 32, for giving room for the elbows, that the pipe section 9 may lie close down upon said bottom for a nearly complete drainage of the tank.

33, is a pipe by which the tank can be filled with liquid from any suitable source.

In delivering whey to the several patrons, it is necessary in order that a uniform quality of whey is given to each, that the whey in the tank is thoroughly stirred, and for an effectual manner of doing so, a plate 34, which may be of any desired area, is secured to the pipe by means of a band 35, which band may be soldered to the plate, tightly around the pipe. By pulling upon the line 23, the pipe can be swung up and down rapidly in the whey and stir it so as to make it uniform in quality, before running any out for patrons.

Having described my invention, and the manner of its operation, what I claim and desire to secure by Letters Patent, is,—

1. A skim milk and whey measuring and delivering device, comprising a tank from which the liquid is to be delivered, a float, a figured scale, and mechanism for indicating the height of the liquid in said tank, a liquid delivery pipe section arranged within, and normally lying upon the bottom of said tank, a connecting thimble passing through said bottom near one side of said tank, suitable connections between said pipe section and thimble, a second delivery pipe section extending in a horizontal direction below said tank from said connecting thimble, its outer or free end being arranged for being swung in a lateral direction, one end of said inside pipe section being provided with a suitable liquid receiving mouth, and a suitable flexible connection arranged for being swung in a lateral direction, one end of said inside pipe section being provided with a suitable liquid receiving mouth, and a suitable flexible connection arranged for having the free end of said inside pipe section swung upward above the surface of the liquid in said tank, a second measuring scale arranged outside of said tank, figured to correspond with the scale of said float, said flexible connection from the free end of said inside pipe section running alongside of said second measuring scale.

2. A skim milk and whey measuring and delivering device, comprising a tank from which the liquid can be delivered, a float, a flexible connection thereto and a figured scale outside of said tank for indicating the height of the liquid therein, a section of liquid delivering pipe arranged within, and normally lying upon the bottom of said tank, one end of said section being provided with suitable elbows and unions for permitting its other and free end to be swung upward above the surface of the liquid in said tank, a flexible connection extending from said free end, a scale figured to correspond with the scale of said float, arranged outside of said tank, a section of delivery pipe arranged outside of said tank and being connected to the first section through the bottom of said tank, suitable elbows and unions for connecting said two sections and permitting the second section to swing in both a lateral direction and upward.

3. In a skim milk and whey measuring and delivering device, the combination of the following elements: a tank, a float arranged for indicating the height of liquid in said tank, a figured scale for use in connection with said float, the pipe section 9, elbows 10 and 12, thimbles or unions 11 and 14, packing pieces 13 and 15, nut 18, elbow 17, union 18, elbow 19 and pipe sections 20 and 20ª, a flexible connection connected with the free end of the pipe 9, and a scale for use in connection with said pipe, figured to correspond with the figures on said float scale.

4. In a skim milk and whey measuring and delivering device, a tank for holding the liquid, and a combined stirrer and delivery pipe section arranged inside of said tank near the bottom thereof, one end of said pipe section being arranged near one side of said bottom in a suitable manner for permitting its free end to be raised above the surface of the liquid in said tank, a stirrer plate secured to said pipe section near said free end, and a flexible connection extending from said free pipe end to where it can be grasped by the operator for swinging the pipe end and stirrer plate up and down within the liquid and equalizing the quality of the entire contents of the tank.

CARL A. JOHNSON.

Witnesses:
  H. M. TYLER,
  F. E. TYLER.